United States Patent [19]

Hultberg

[11] Patent Number: 4,976,344
[45] Date of Patent: Dec. 11, 1990

[54] METHOD FOR TRANSFERRING ARTICLES

[75] Inventor: Jimmy Hultberg, Ryd, Sweden

[73] Assignee: AB Volvo, Gothenburg, Sweden

[21] Appl. No.: 68,225

[22] Filed: Jun. 30, 1987

[30] Foreign Application Priority Data

Jul. 10, 1986 [SE] Sweden ................................ 8603081

[51] Int. Cl.⁵ .............................................. B65G 47/30
[52] U.S. Cl. .................................. 198/418.2; 198/431;
414/798.5
[58] Field of Search ............ 198/419, 420, 431, 418.2;
901/7, 8; 53/534, 542, 154, 240, 247, 237;
414/416, 103, 107, 110, 799, 790.9, 791.1, 798.5

[56] References Cited

U.S. PATENT DOCUMENTS

| | | | |
|---|---|---|---|
| 4,199,913 | 4/1980 | Hood et al. | |
| 4,200,420 | 4/1980 | Cathers et al. | 414/798.5 |
| 4,444,537 | 4/1984 | Werner | 414/107 |
| 4,503,507 | 3/1985 | Takeda et al. | 901/8 X |
| 4,557,655 | 12/1985 | Berg . | |
| 4,568,234 | 2/1986 | Lee et al. | 414/416 X |
| 4,583,351 | 4/1986 | Fallas | 53/542 X |
| 4,720,130 | 1/1988 | Andou | 414/416 X |
| 4,773,523 | 9/1988 | Hansen, Jr. et al. | 198/418.2 X |

FOREIGN PATENT DOCUMENTS

| | | |
|---|---|---|
| 340827 | 1/1978 | Austria . |
| 2123986 | 11/1972 | Fed. Rep. of Germany . |
| 2074127 | 10/1981 | United Kingdom . |
| 2156762 | 10/1985 | United Kingdom . |

Primary Examiner—Joseph J. Rolla
Assistant Examiner—D. Glenn Dayoan
Attorney, Agent, or Firm—Young & Thompson

[57] ABSTRACT

A method for transferring articles from a conveyor to a rack or magazine. The articles are gripped one at a time by a gripping device and are moved from the conveyor while being brought to a correct position of alignment in relation to the rack, whereafter the article is placed in the rack. In accordance with the invention the article transfer is effected in at least two transfer stations which work in parallel and which are arranged one after the other along the conveyor path, each transfer station including an industrial robot. A plurality of racks are moved sequentially along a path which extends through all transfer stations. Only a given part of each rack is filled in each transfer station, such that the rack will be completely filled subsequent to passing through all the transfer stations.

2 Claims, 1 Drawing Sheet

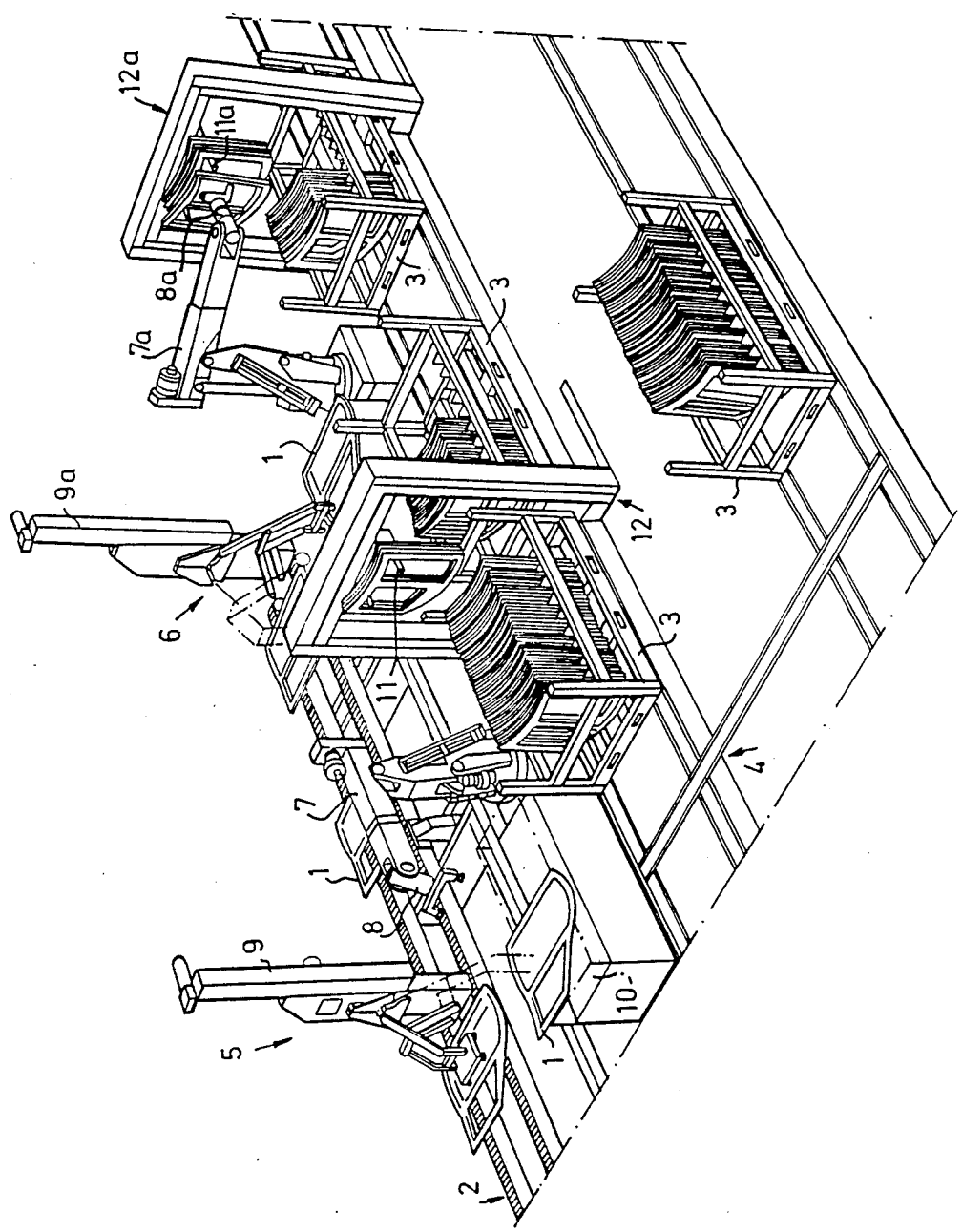

METHOD FOR TRANSFERRING ARTICLES

BACKGROUND OF THE INVENTION

The present invention relates to a method for transferring articles from a conveyor or transporter on which the articles are advanced sequentially, one at a time, to a rack or magazine, into which the articles are placed in given positions closely adjacent one another, in which method one article at a time is gripped by means of a transfer device and moved and brought to a correct position of alignment in relation to the rack and, in conjunction therewith, introduced into said rack, said transfer device being provided with gripping means for gripping and firmly holding an article, and with movement and aligning means for moving the article held by the gripping means and bringing said article into a correct position of alignment in relation to the rack, and introducing said article into the rack.

The requirement of transferring articles from a conveyor or transporter is found in various industrial processes, in which the articles are advanced sequentially, one at a time, for example from a working or processing station to a rack or magazine, in which the articles are placed close together, whereafter the rack or magazine is used to transport the articles to a further processing station or to a consumer station. This is the case, for example, with articles that comprise pressed sheet-metal elements which are discharged singly from the press and which shall then be transferred to a rack for transportation to an assembly station for example. It is important in cases such as these that the rack is completely filled with articles or objects, which are therewith placed in close side-by-side relationship so as to utilize the space available to the best possible extent.

DESCRIPTION OF THE PRIOR ART

Previously, the work of transferring the articles from the conveyor to the racks has been carried out manually. This work, however, is both heavy and troublesome, and consequently attempts have been made to merchanize the work. Those attempts to merchanizing such work, however, have not hitherto met with success. The arrangements used herefor have been expensive, complicated and type bound, and also require a relatively large amount of space. Another drawback with the known arrangements is that they are unable to operate quickly enough to transfer all of the articles discharged to a conveyor from, for example, a modern sheet-metal pressing plant.

SUMMARY OF THE INVENTION

The object of the present invention is to provide a method and an arrangement of the kind mentioned in the introduction which avoids these drawbacks and which will enable articles to be transferred quickly and effectively. This object is achieved by means of the invention method set forth below.

BRIEF DESCRIPTION OF THE DRAWING

The invention will now be described in more detail with reference to the accompanying drawing, which illustrates in perspective one embodiment of an arrangement for carrying out the inventive method.

DESCRIPTION OF THE PREFERRED EMBODIMENT

The arrangement illustrated in the drawing is intended to be placed adjacent a sheet-metal press plant, from which pressed articles 1, in this case door panels for vehicle doors, are fed onto a conveyor or transporter 2 which moves from left to right as seen in the drawing. The articles are placed in series relationship on the conveyor, with a given spacing between mutually adjacent articles. The articles 1 are to be transferred into racks or magazines 3 which move along a path 4, as described in more detail hereafter. Two transfer stations 5 and 6 are provided for the transfer of articles, these stations being located one behind the other along the conveyor 2.

The two transfer stations 5 and 6 have mutually the same construction and function, and hence the various corresponding components of the stations are identified with mutually the same reference numerals, although the components of the station 6 are further identified by the suffix a. The most important component of a transfer station of this kind is an industrial robot 7 and 7a, located between the conveyor 2 and the path 4. The robot 7 and 7a is provided with a respective gripping device 8 and 8a, which in the illustrated embodiment comprise suction devices which hold an article 1 with the aid of a vacuum. In the simplest case, the robot 7 and 7a collects an article 1 directly from the conveyor 2, with the aid of respective gripping devices 8 and 8a, and moves the object while turning the same about mutually different axes in a manner to bring the object into a correct position of alignment of introduction into the rack 3, whereafter the robot 7 and 7a places its respective article into the rack. The robot 7 located in the transfer station 5 takes every alternate article 1 from the conveyor 2, while the remaining articles 1 on the conveyor 2 are collected therefrom by the robot 7a located in the transfer station 6.

In the case of the illustrated embodiment of the arrangement, however, the robots 7 and 7a do not collect the articles 1 directly from the conveyor 2. Instead, each transfer station 5, 6 is equipped with a respective feed device 9 and 9a which transfers respective articles 1 from the conveyor 2 to a respective support device 10 and 10a, from which the articles are collected by the gripping devices 8 and 8a of respective robots 7 and 7a. The robots 7 and 7a then place the articles in carrier devices 11 and 11a in a respective intermediate storage means 12 and 12a, therewith to form a group of articles 1 on respective carrier devices 11 and 11a. When the group of collected articles has reached a given size, the carrier devices 11 and 11a in the intermediate storage means 12 and 12a are moved so as to introduce the group of articles into the rack 3. It is conceivable, of course, for the robots 7 and 7a to transfer respective articles to the rack 3 directly from respective support devices 10 and 10a.

According to the invention, the racks 3 are moved along the path 4 in a given manner. As will best be seen from the half-filled rack 3 located between the illustrated transfer stations 5 and 6, each rack 3 has provided thereon inwardly projecting supports 13 which divide the available space in the rack into a number of locations for the articles 1. Each such location may be intended for a single article or for a group of articles, this latter case being the one illustrated. The racks are advanced stepwise along the path 4 in a manner such that subsequent to the deposit of a group of articles in one location, each rack is stepped forwards through a distance such as to bring the next location in the rack into its correct position for receiving the next group of articles 1. Alternatively, the intermediate storage means 12 and 12a may be advanced stepwise, to achieve the same positioning of the groups of articles in relation to the rack 3. Furthermore, the racks 3 are advanced in a manner such that each rack 3 in the transfer station 6 is only filled to half its capacity, whereafter the rack is advanced to an intermediate position and then finally to the transfer station 5, where the remainder of the rack is filled. An empty rack 6 is advanced at the same time into the transfer station 6.

In that case when the robots 7 and 7a transfer articles 1 directly into the rack 3, the desired transfer of articles can be achieved either by advancing the rack 3 stepwise or by programming the robots 7 and 7a to introduce the articles 1 into mutually different locations in the rack, or by a combination of these measures.

When commencing operation, an empty rack 3 is placed in each transfer station 5 and 6. When each of the racks 3 has been filled to half of its capacity, the rack in the transfer station 6 is advanced to the intermediate position and an empty rack is advanced into the transfer station 6. The rack 3 in the transfer station 5, on the other hand, is not moved. The fresh rack located in the transfer station 6 is then filled to half its capacity, while the remaining capacity of the first rack in the transfer station 5 is filled in said station. At the same time, the half-filled rack is located in the intermediate postion. This completes the starting process, and the process is continued in the aforedescribed manner.

The invention is not restricted to the aforedescribed embodiment, and modifications can be made within the scope of the following claims.

I claim:

1. In a method of assembling in a rack a plurality of identical articles, comprising positioning said articles in a series that extends lengthwise on an elongated conveyor that moves in the direction of its length, positioning along said conveyor a plurality of article transfer stations, positioning adjacent each article transfer station a rack for the storage of a plurality of said articles, transferring, in each article transfer station, articles from said conveyor to said rack, the number of articles transferred in each article transfer station being equal to the number of articles conveyed divided by the number of article transfer stations, said articles having a length and width substantially greater than their thickness, placing said articles horizontally on said conveyor, and transferring ring said articles in said article transfer stations into upright side-by-side position in said rack; the improvement comprising collecting in each transfer station a group of said articles in upright side-by-side position, transferring said group of said articles into said rack while maintaining said articles in upright side-by-side position, and placing a plurality of said groups in said rack in each said transfer station.

2. In a method of assembling in a rack a plurality of identical articles, comprising positioning said articles in a series that extends lengthwise on an elongated conveyor that moves in the direction of its length, positioning along said conveyor a plurality of article transfer stations, positioning adjacent each article transfer station a rack of the storage of a plurality of said articles, transferring, in each article transfer station, articles from said conveyor to said rack, the number of articles transferred in each article transfer station being equal to the number of articles conveyed divided by the number of article transfer stations, said articles having a length and width substantially greater than their thickness, placing said articles horizontally on said conveyor, and transferring said articles in said article transfer stations into upright side-by-side position in said rack; the improvement comprising disposing said articles in said rack in a stack that extends parallel to said length of said conveyor with said length and width of said articles being transverse to said length of said conveyor.

* * * * *